US 8,371,349 B2

(12) United States Patent
Colombo et al.

(10) Patent No.: US 8,371,349 B2
(45) Date of Patent: Feb. 12, 2013

(54) TYRE FOR MOTOR VEHICLES

(75) Inventors: Gianfranco Colombo, Milan (IT);
Stefano Montesello, Milan (IT);
Roberto Sangalli, Milan (IT); Nevio Zani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 586 days.

(21) Appl. No.: 12/452,467

(22) PCT Filed: Jul. 5, 2007

(86) PCT No.: PCT/IB2007/052642
§ 371 (c)(1),
(2), (4) Date: Dec. 31, 2009

(87) PCT Pub. No.: WO2009/004408
PCT Pub. Date: Jan. 8, 2009

(65) Prior Publication Data
US 2010/0108214 A1    May 6, 2010

(51) Int. Cl.
*B60C 11/03*    (2006.01)
(52) U.S. Cl. ............. 152/209.8; 152/209.9; 152/209.17; 152/209.22; 152/DIG. 3
(58) Field of Classification Search ............. 152/209.8, 152/209.9, 209.17, 209.22, 901, DIG. 3; D12/519, 522, 523, 524
See application file for complete search history.

(56) References Cited

U.S. PATENT DOCUMENTS
D490,047 S * 5/2004 Heinen et al. ................ D12/524
2005/0173035 A1  8/2005 Heinen FOREIGN PATENT DOCUMENTS
EP    1 564 029 A1    8/2005
JP    01-282005 A  * 11/1989
WO    WO 2006/007877 A1    1/2006

OTHER PUBLICATIONS
European Search Report for International Application No. PCT/IB2007/052642, mailing date Feb. 27, 2008.

* cited by examiner

*Primary Examiner* — Steven D Maki
(74) *Attorney, Agent, or Firm* — Finnegan, Henderson, Farabow, Garrett & Dunner, L.L.P.

(57) ABSTRACT

The tread band of a tire has two circumferential portions, a central one and an inner intermediate one, respectively, that are subdivided into center and intermediate blocks respectively; an inner-shoulder circumferential portion has first and second inner-shoulder cuts, axially offset from each other and distributed in an alternated sequence, to confine a continuous inner-shoulder rest surface with an undulated course; and an outer intermediate circumferential portion has first and second intermediate cuts, and an outer-shoulder circumferential portion has first and second outer-shoulder cuts. The first and second intermediate cuts and the outer-shoulder cuts, respectively, mutually converge at an angle of about 20° and are axially offset from each other and circumferentially distributed in an alternated sequence, to delimit continuous rest surfaces, an intermediate and outer-shoulder surface respectively, with an undulated course.

52 Claims, 3 Drawing Sheets

TYRE FOR MOTOR VEHICLES

CROSS REFERENCE TO RELATED APPLICATION

This application is a national phase application based on PCT/IB2007/052642, filed Jul. 5, 2007, the content of which is incorporated herein by reference.

BACKGROUND OF THE INVENTION

1. Field of the Invention

The present invention relates to a tyre for vehicles. More particularly, the invention applies to High Performance and Ultra High Performance cars and racing cars, in particular cars for rally driving, having high handling qualities.

2. Description of the Related Art

Optimal features in terms of traction power and grip performance on braking as well as handling on dry and wet roadway surfaces and satisfactory wear resistance are usually required from tyres of this class.

Known are tyres for vehicles having a tread provided with blocks confined by circumferential grooves, extending in a substantially longitudinal direction, and transverse grooves extending in a substantially axial direction. The blocks resulting from interlacing of said grooves have several different shapes that are suitably studied and disposed in circumferential side by side rows, each of which is enclosed between two subsequent circumferential grooves.

The circumferential grooves can affect the steering and steady running properties of the tyre in relation to lateral thrusts (slip thrusts) directed parallel to the rotation axis of the tyre itself.

The transverse grooves, in turn, can affect the tyre traction power, i.e. the capability of efficiently receiving the tangential thrusts parallel to the running direction from the roadway surface, during the acceleration and braking steps of the vehicle.

The circumferential and transverse grooves can also affect draining of the water in the contact area with the roadway surface (footprint area) during running on a wet roadway.

WO 2006-007877, in the name of the same Applicant, proposes a tyre the tread band of which has at least one first and one second circumferential grooves separating a central portion from two shoulder portions. To some distance from at least one of the circumferential grooves, a circumferential cut is formed. The tread band is crossed by transverse grooves distributed in repeated circumferential modules, each of which in at least one shoulder portion has a main groove having a first substantially rectilinear segment inclined at an angle included between 3° and 10° relative to a radial plane of the tyre, a second substantially rectilinear segment extending between the circumferential cut and the first circumferential groove at an angle included, just as an indication, between 105° and 130° relative to the radial plane, and a curvilinear portion for connection between the first and second segments.

SUMMARY OF THE INVENTION

The Applicant has noticed that the transverse grooves with marked inclination can interact on the ground and above all during a strong-acceleration or braking step on a straight run stretch, can generate undesirable components of slip thrusts directed parallel to the tyre axis. These slip thrusts can impair the steady running and steering property of the vehicle, forcing the driver to carry out sudden trajectory corrections by the steering gear. In vehicles with front-wheel drive the slip thrusts can in addition induce through the kinematic mechanisms of the steering gear, undesirable reactions on the steering wheel that must be promptly. opposed by the driver. The Applicant has noticed that in uses under hard situations, these drive conditions can cause damages in terms of performance decay, consequent elongation of the run times, driver's fatigue and loss of concentration in driving the vehicle.

It is therefore the Applicant's firm belief that in a tyre for high-performance vehicles, also suitable for hard uses on the road or on racing tracks, achievement of a good balancing of the tyre response without initiating undesirable slip thrusts during running on a straight stretch is important.

The Applicant has further noticed that a tyre suitable for sports uses also under very severe conditions must have excellent handling qualities, to promote a prompt response of the car to the steering gear movements, particularly on getting over a bend. It is the Applicant's firm belief that these handling qualities are particularly affected by the structure of the tread pattern at the regions close to the tyre shoulders, above all at the axially external shoulder. In fact, the Applicant could notice that the transmitted stresses between the tyre and roadway surface, when bends are negotiated at high speed, act much more at these outer-shoulder regions.

A tyre intended for use on production-model cars, including higher quality cars, must in any case also respond to ride safety requirements when running at high speed on wet roadway surfaces. Due to this requirement, the tread band must necessarily be provided with suitable grooves aiming at receiving and efficiently eliminating water from the footprint area during running, avoiding starting of the so-called aquaplaning phenomena.

The Applicant has however noticed that the transverse grooves have a tendency to weaken the tread structure, impairing the handling qualities that are fundamental in a tyre also conceived for racing uses.

The Applicant has found that the mutually conflicting problems set out above are solved by a tread pattern in which the grooves dedicated to water draining from the footprint area are more concentrated in the axially intermediate regions of the tyre, while the regions closest to the side edges, instead of having transverse grooves, are provided with substantially transverse cuts terminating at a proper distance from the circumferential grooves and/or the side edges of the tread band. These cuts are distributed in an alternated sequence, in such a manner as to define continuous rest surfaces extending in an undulated course, along the circumferential extension of the tread band.

More particularly, according to an aspect, the present invention relates to a tyre for vehicles comprising a tread band having:

- a central circumferential portion disposed close to an equatorial plane of the tyre and axially confined between two circumferential centre grooves;
- an inner intermediate circumferential portion axially confined between an inner-shoulder circumferential groove and the circumferential centre groove axially close to said inner-shoulder circumferential groove;
- an inner-shoulder circumferential portion axially confined between said inner-shoulder circumferential groove and an axially internal side edge of the tread band;
- an outer intermediate circumferential portion axially confined between an outer-shoulder circumferential groove and the circumferential centre groove axially close to said outer-shoulder groove;
- an outer-shoulder circumferential portion axially confined between said outer-shoulder circumferential groove and an axially external side edge of the tread band;

wherein:
said central circumferential portion is subdivided into centre blocks circumferentially confined between transverse centre cuts opening into the circumferential centre grooves;
said inner intermediate circumferential portion is subdivided into intermediate blocks circumferentially confined between intermediate transverse grooves, each opening into the respective circumferential centre groove and said inner-shoulder circumferential groove;
said inner-shoulder circumferential portion has first and second inner-shoulder cuts axially offset from each other and circumferentially distributed in an alternated sequence to delimit at least one continuous inner-shoulder rest surface extending in an undulated course along the circumferential extension of the inner-shoulder circumferential portion;
said outer intermediate circumferential portion has first and second intermediate cuts extending in directions mutually converging at an angle included between about 10° and about 40°, axially offset from each other and circumferentially distributed in an alternated sequence, to delimit at least one continuous intermediate rest surface extending in an undulated course along the circumferential extension of the outer intermediate circumferential portion;
said outer-shoulder circumferential portion has first and second outer-shoulder cuts extending in mutually converging directions at an angle included between about 10° and about 40°, axially offset from each other and circumferentially distributed in an alternated sequence, to define at least one continuous outer-shoulder rest surface extending in an undulated course along the circumferential extension of the outer-shoulder circumferential portion.

The continuous rest surfaces defined in the shoulder portions and outer intermediate portion give the tread band a high structural consistence at the circumferential shoulder portions and the outer intermediate circumferential portion, so as to ensure excellent handling qualities.

In addition, the respectively crossed course and the arrangement in an alternated sequence of the cuts reduces the initiation of undesirable slip thrusts to a minimum on a straight stretch, in particular during the acceleration and braking steps.

The transverse grooves formed in the central circumferential portion and the inner intermediate circumferential portion co-operate with the circumferential centre grooves and intermediate grooves in order to enable an efficient draining of the water from the central regions of the footprint area, where water elimination is basically more critical.

The continuous rest surfaces defined in the shoulder portions and the outer intermediate portion simultaneously offer an appropriate support to the tread band in the footprint area, so as to reduce the load weighing on the blocks, thereby limiting wear of same and the noisy running phenomena resulting from the impact on the ground during rolling.

The present invention in the above mentioned aspect, can have at least one of the preferred features hereinafter described.

To obtain good traction power and grip performance on braking, the first and second outer-shoulder cuts extend in mutually converging directions at an angle included between about 15° and about 25°.

The first and second intermediate cuts too can extend in mutually converging directions at an angle included between about 15° and about 25°.

The outer-shoulder circumferential portion has a width included between about 15% and about 20% of an overall width of the tread band.

The outer intermediate circumferential portion has a width included between about 15% and about 20% of an overall width of the tread band.

The central circumferential portion has a width included between about 14% and about 19% of an overall width of the tread band.

The inner intermediate circumferential portion has a width included between about 12% and about 18% of an overall width of the tread band.

The inner-shoulder circumferential portion has a width included between about 16% and about 22% of an overall width of the tread band.

The outer-shoulder circumferential portion has a solid/hollow ratio included between about 0.12 and about 0.24.

The outer intermediate circumferential portion has a solid/hollow ratio included between about 0.16 and about 0.32.

The central circumferential portion has a solid/hollow ratio included between about 0.22 and about 0.36.

The inner intermediate circumferential portion has a solid/hollow ratio included between about 0.27 and about 0.37.

The inner-shoulder circumferential portion has a solid/hollow ratio included between about 0.20 and about 0.26.

Thus an efficient water draining from the footprint area is promoted during running on a wet roadway surface, keeping a good behaviour when accelerating and braking, as well as during direction changes and on negotiating bends at high speed.

The first and second intermediate cuts extend in symmetrically mutually converging directions relative to a direction perpendicular to the equatorial plane.

The first and second outer-shoulder cuts extend in symmetrically mutually converging directions relative to a direction perpendicular to the equatorial plane.

The first intermediate cuts each extend in a direction parallel to one of said first outer-shoulder cuts.

The second intermediate cuts each extend in alignment with one of said second outer-shoulder cuts.

The second intermediate cuts each extend in the continuation of one of said second outer-shoulder cuts, through said outer-shoulder circumferential groove.

The first intermediate cuts and first outer-shoulder cuts are oriented substantially parallel to the first inner-shoulder cuts.

The second intermediate cuts and second outer-shoulder cuts are oriented substantially parallel to said intermediate transverse grooves.

Thus a good balancing of the slip thrusts transmitted by the tyre on a straight stretch is obtained and in particular during the accelerating and braking steps.

In addition, auxiliary outer-shoulder cuts can be provided which extend from the axially external side edge of the tread band and are each aligned with one of said second outer-shoulder cuts, in a converging direction relative to the extension of the first outer-shoulder cuts.

The first intermediate cuts substantially have a length corresponding to the sum of the lengths of the second intermediate cuts and the second outer-shoulder cuts.

The first outer-shoulder cuts have a greater length than that of the second outer-shoulder cuts.

The length of each first outer-shoulder cut is greater than the sum of the lengths of one of the second outer-shoulder cuts and one of said auxiliary outer-shoulder cuts.

The first and second outer-shoulder cuts have ends with a rounded profile.

The first and second intermediate cuts have at least one end with a rounded profile.

The inner-shoulder circumferential groove and the outer-shoulder circumferential groove are symmetrically disposed relative to said equatorial plane.

The first and second inner-shoulder cuts respectively extend from the axially internal side edge of the tread band to said inner-shoulder circumferential groove.

The first inner-shoulder cuts are obliquely oriented at an angle included between about 5° and about 20° relative to a direction perpendicular to the equatorial plane.

The second inner-shoulder cuts are obliquely oriented at an angle included between about 5° and about 20° relative to a direction perpendicular to the equatorial plane.

The first inner-shoulder cuts are oriented parallel to the second inner-shoulder cuts.

The first inner-shoulder cuts have a greater length than that of the second inner-shoulder cuts.

In addition, auxiliary inner-shoulder cuts can be provided which extend each from said inner-shoulder circumferential groove in alignment with one of said second inner-shoulder cuts.

The length of each first inner-shoulder cut substantially corresponds to the sum of the lengths of one of the second inner-shoulder cuts and one of said auxiliary inner-shoulder cuts.

Said first inner-shoulder cuts and auxiliary inner-shoulder cuts have respective ends in circumferential alignment with each other.

The first and second inner-shoulder cuts have respective ends with a rounded profile.

The circumferential centre grooves are symmetrically disposed relative to said equatorial plane.

The transverse centre cuts, converging into one and the other respectively of said circumferential centre grooves are mutually connected to form transverse centre grooves each opening into both the circumferential centre grooves.

Said intermediate blocks are circumferentially offset relative to the centre blocks.

The centre blocks and intermediate blocks have a substantially parallelogram-shaped conformation.

The transverse centre cuts are obliquely oriented at an angle included between about 5° and about 20° relative to a direction perpendicular to the equatorial plane.

The intermediate transverse grooves are obliquely oriented at an angle included between about 5° and about 20° relative to a direction perpendicular to the equatorial plane.

The intermediate transverse grooves are oriented parallel to the transverse centre cuts.

Each of said centre grooves has a width included between about 5 mm and about 15 mm.

Said circumferential centre grooves have the same width with respect to each other.

The inner-shoulder circumferential groove has a smaller width than that of the circumferential centre grooves.

The inner-shoulder circumferential groove has a width included between about 5 mm and about 12 mm.

The outer-shoulder circumferential groove has a smaller width than that of the circumferential centre grooves.

The outer-shoulder circumferential groove has a smaller width than that of the inner-shoulder circumferential groove.

The outer-shoulder circumferential groove has a width included between about 1 mm and about 8 mm.

At least the first outer-shoulder cuts have ends spaced apart from the outer-shoulder circumferential groove by a distance included between about 2.5 mm and about 10 mm.

At least said first intermediate cuts have ends spaced apart from the outer-shoulder circumferential groove by a distance included between about 4 mm and about 10 mm.

Further features and advantages will become more apparent from the detailed description of a preferred embodiment of a tyre for vehicles, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
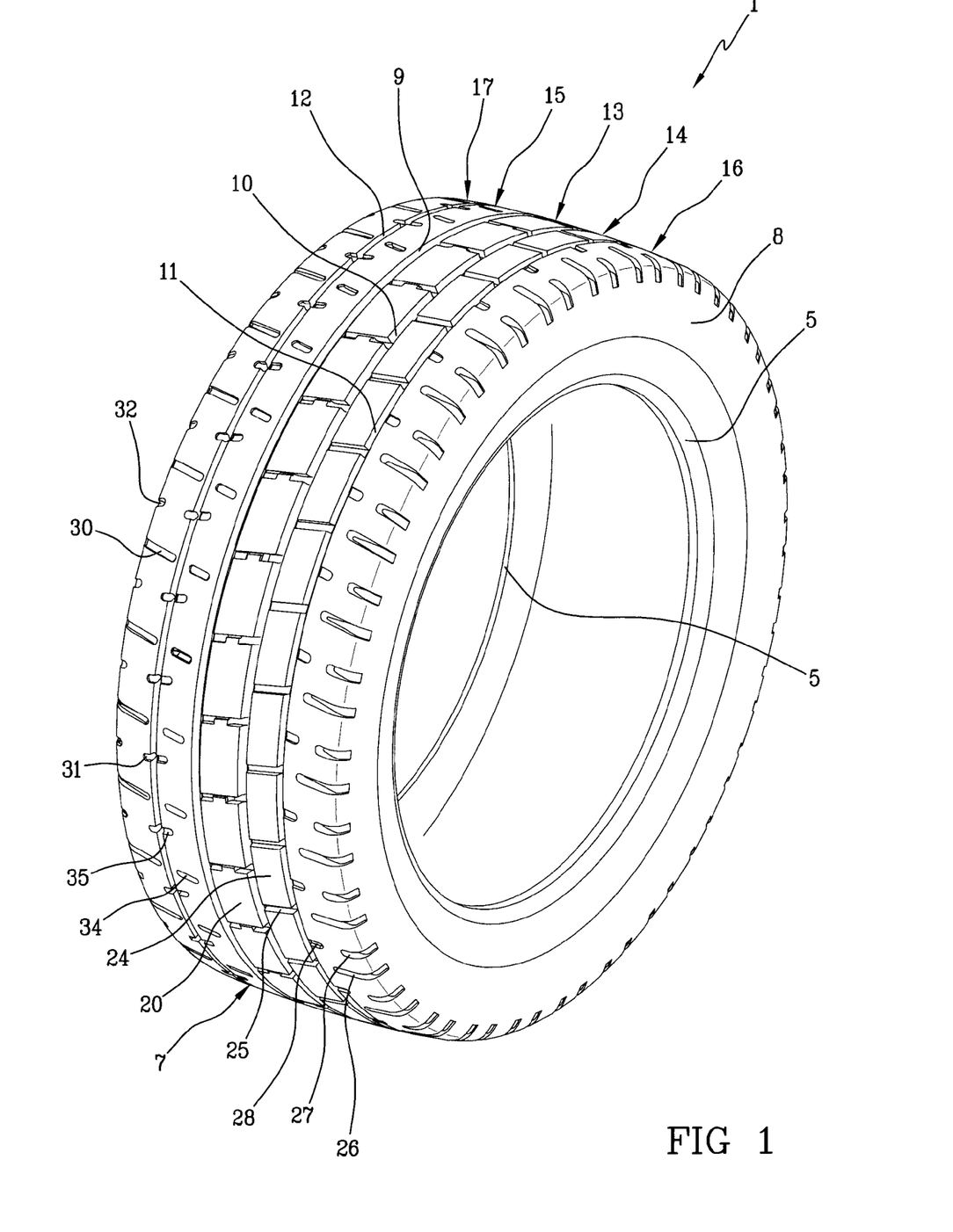
FIG. 1 is a perspective view of a tyre made in accordance with the present invention.
Figure 2:
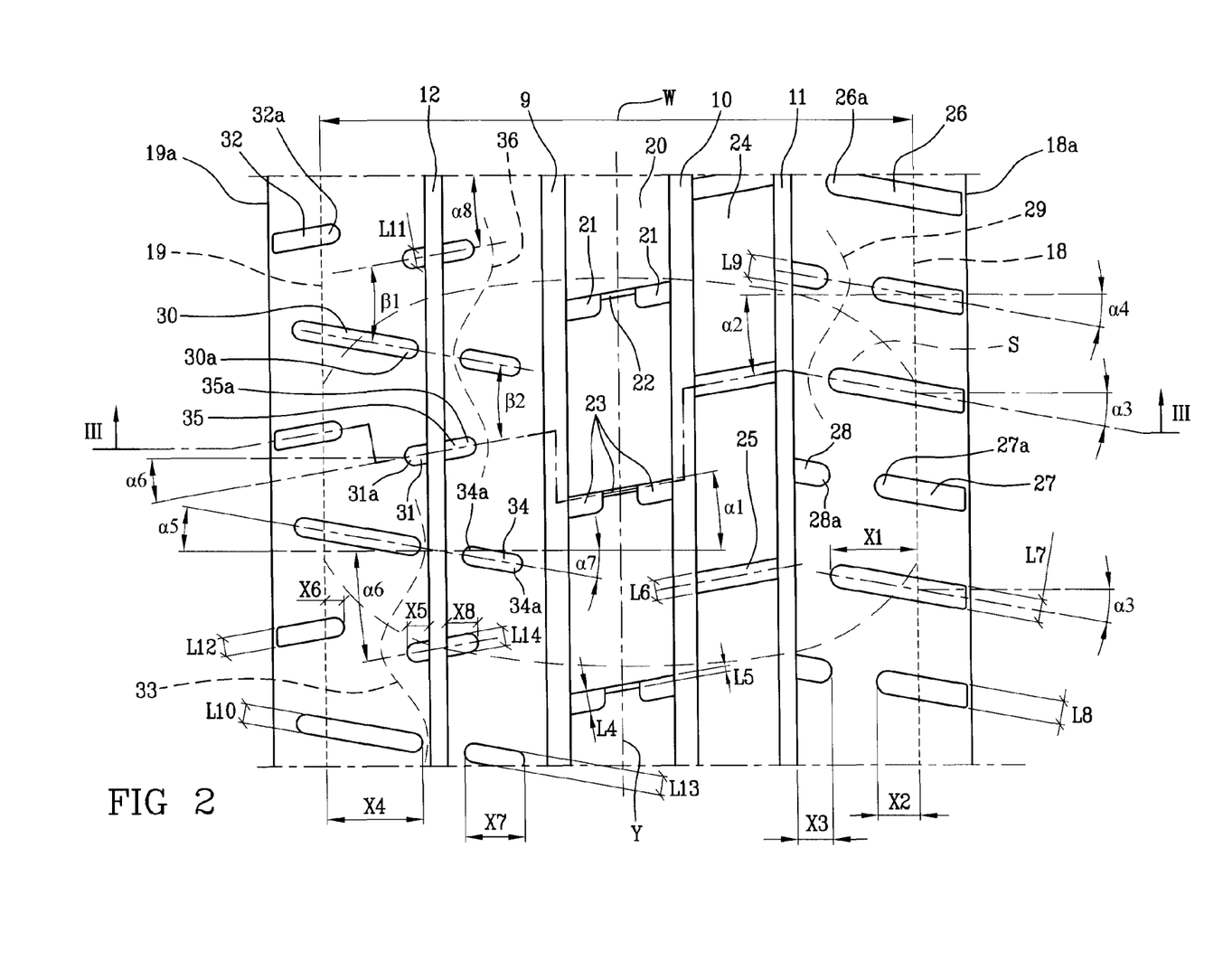
FIG. 2 is a fragmentary view diagrammatically showing the plan development of a tread band of the tyre seen in FIG. 1.
Figure 3:
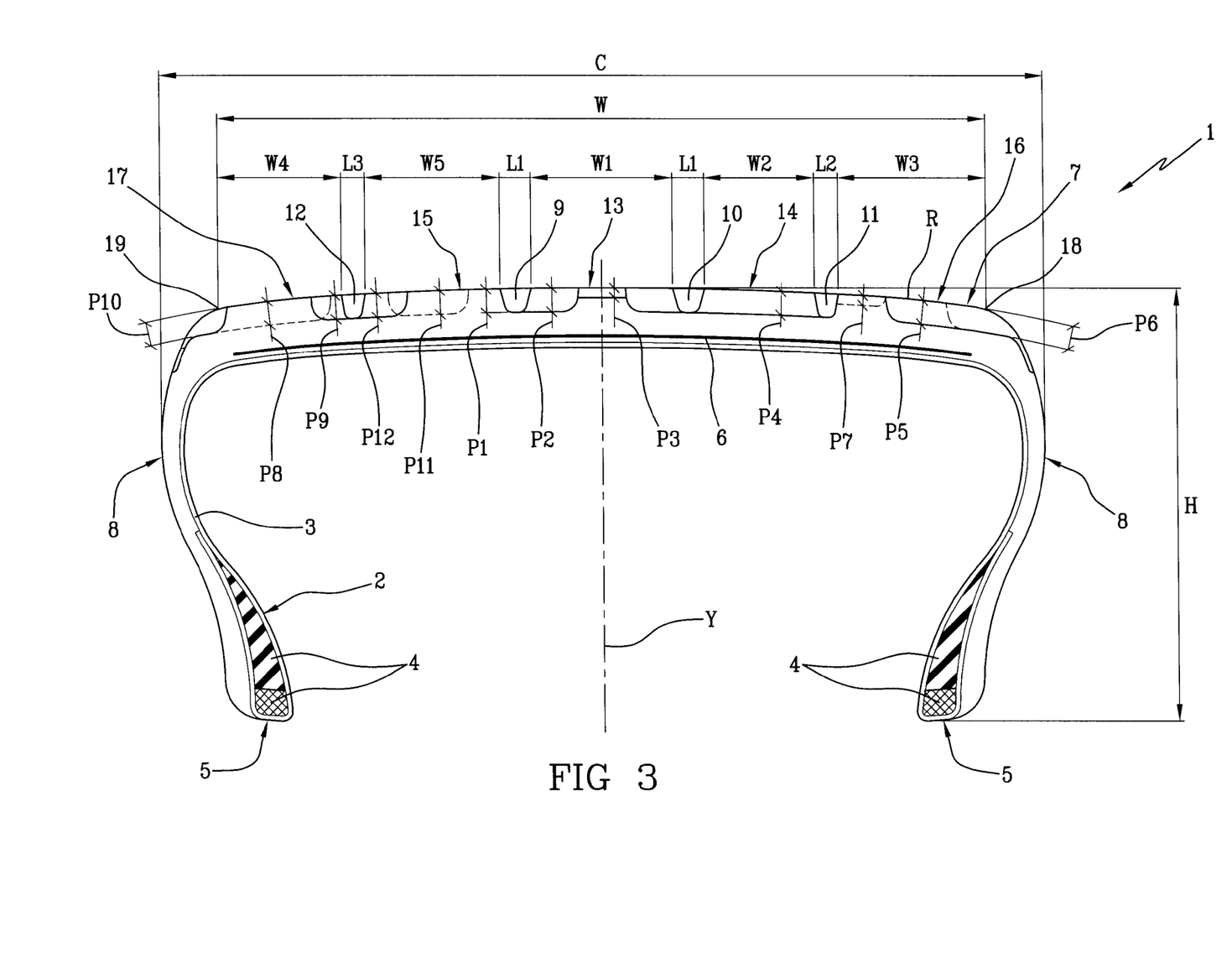
FIG. 3 is a fragmentary diametrical section of the tyre seen in FIG. 1.

With reference to the above figures, a tyre for vehicles in accordance with the present invention has been generally identified by reference numeral 1.

Tyre 1 essentially comprises a carcass structure 2 having at least one carcass ply 3 in engagement with two annular anchoring structures 4 integrated into the regions currently identified as "beads" 5, at which usually engagement between tyre 1 and a respective mounting rim occurs.

A belt structure 6 is circumferentially applied around the carcass ply/plies 3 and a tread band 7 circumferentially overlaps the belt structure 6.

Two sidewalls 8, each extending from the corresponding bead 5 to a corresponding side wall of the tread band 7 are applied at laterally opposite positions to the carcass ply/plies 3.

Tyre 1, particularly conceived for high and ultra-high performance vehicles, also designed for use in sports races, preferably has a greatly low-section structure, with a H/C value included between 30 and 65, expressed as a percentage value of the ratio between the tyre height H in radial section measured between the radially external end of the tread band and the line joining the radially internal ends of the tyre itself and the maximum chord C measurable on said section, in parallel to the rotation axis of the tyre (FIG. 3).

The tread band 7 externally has a rolling surface R that, under normal operating conditions, acts against the ground at a so-called footprint area S that, by effect of deflection of tyre 1, usually takes a substantially ellipsoidal conformation, as shown in chain line in FIG. 2.

Formed in the rolling surface R are circumferential and transverse grooves and cuts that, altogether, co-operate in defining a so-called "tread pattern" the features of which affect the tyre behaviour on running.

To the aims of the present specification, by "cut" it is intended a recess having at least one blind end, i.e. an end located inside the surface extension of the tread band 7 without converging into any other recess present in the tread band 7 itself.

On the contrary "groove" means a recess devoid of any blind end and/or extending in a closed line, as in the case of the circumferential grooves, for example.

Tyre 1 preferably has a tread pattern of the so-called "asymmetric" type, i.e. a tread pattern that on opposite sides relative to an equatorial plane Y, has regions geometrically different from each other on the axially internal side and axially external side respectively of tyre 1.

To the aims of the present specification, the terms "internal (inner)" and "external (outer)" refer to the vehicle on which tyre 1 is mounted: "internal" means "internal relative to the vehicle", while "external" means "external relative to the vehicle".

The rolling surface R of the tread band 7 is crossed by four circumferential grooves 9, 10, 11, 12 having a depth P1 included just as an indication between about 2 mm and about 8 mm, equal to 6 mm for example, confining five circumferential portions 13, 14, 15, 16, 17.

In more detail, a first and a second centre circumferential grooves 9, 10 are provided which are preferably spaced apart the same distance from the equatorial plane Y, between which a central circumferential portion 13 disposed close to the equatorial plane Y itself is confined.

These circumferential centre grooves 9, 10 preferably have widths L1 equal to each other, each being included by way of example between about 5 mm and about 15 mm.

An inner-shoulder circumferential groove 11 and an outer-shoulder circumferential groove 12, each by one of said circumferential centre grooves 9, 10, confine an inner intermediate circumferential portion 14 and an outer intermediate circumferential portion 15 disposed side by side on respectively opposite parts relative to the central circumferential portion 13.

Each of the inner-shoulder 11 and outer-shoulder 12 circumferential grooves preferably has a smaller width L2, L3 than that of the circumferential centre grooves 9, 10. More particularly, the inner-shoulder circumferential groove 11 has a width L2 included by way of example between about 5 mm and about 12 mm, while the width L3 of the outer-shoulder circumferential groove 12, preferably smaller than that of the inner-shoulder circumferential groove 11, is just as an indication included between about 1 mm and about 8 mm. An inner-shoulder circumferential portion 16 is confined between an axially internal side edge 18 of the tread band 7 and the inner-shoulder circumferential groove 11.

An outer-shoulder circumferential portion 17 is axially confined between the outer-shoulder circumferential groove 12 and an axially external side edge 19 of the tread band 7.

It is to be pointed out to the aims of the present specification and the subsequent claims, that the axially internal 18 and axially external 19 side edges of the tread band 7 are identified at the axially opposite ends of the footprint area S, not necessarily corresponding to the end side edges 18a, 19a of the tread band 7 itself, usually located at a radially internal position relative to the rolling surface R and therefore not concerned with a direct contact with the ground.

The width taken up on the whole by the circumferential grooves 9, 10, 11, 12 on the rolling surface R is preferably included between about 7.5% and about 24.5% of the overall width W of the tread band 7, measured between the axially opposite ends of the footprint area S.

Consequently, the width taken up on the whole by the circumferential portions 13, 14, 15, 16, 17 is included by way of example between about 75.5% and about 92.5% of the overall width W of the tread band 7.

The central circumferential portion 13 having a width just as an indication included between about 14% and about 19% of the overall width W of the tread band 7 mainly performs the function of being proof against aquaplaning both on a straight stretch and on a bend. Positioning of this portion astride the equatorial plane Y optimises centring and drive accuracy, above all on a straight stretch and the prompt response of tyre 1 during the steps of negotiating a bend.

To promote an efficient water draining from the footprint area S, the central circumferential portion 13 is subdivided into centre blocks 20 having a substantially parallelogram-shaped conformation, each of which is delimited relative to the circumferentially adjacent centre block 20 by a pair of respectively-aligned transverse centre cuts 21 each opening into one of the circumferential centre grooves 9, 10 and having a depth included just as an indication between about 2 mm and about 8 mm, and equal to about 6 mm, for example.

These transverse centre cuts 21, of a width L4 preferably included between about 4 mm and about 8 mm, preferably equal to about 7 mm, are obliquely oriented at an angle $\alpha 1$ included between about 5° and about 20°, preferably of about 10°, relative to a direction perpendicular to the equatorial plane Y.

The transverse centre cuts 21 of each pair, converging into one and the other of said circumferential centre grooves 9, 10 respectively, can be mutually interconnected by a connecting recess 22 to form a transverse centre groove 23 opening into both the circumferential centre grooves 9, 10. In a preferred embodiment, for promoting water draining without impairing the steering property and drive accuracy qualities, the connecting recesses 22 have a width L5 smaller than that L4 of the transverse centre cuts 21 and included, by way of example, between about 1 mm and about 3 mm, preferably of about 2 mm. The connecting recesses 22 can have a smaller depth P3 than that of the transverse centre cuts 21, to keep a proper link between the respectively adjacent centre blocks 20 and promote the steering property on running.

The inner intermediate circumferential portion 14 too, of a width W2 included by way of example between about 12% and about 18% of the overall width W of the tread band 7, accomplishes the function of resistance to aquaplaning, above all taking into account the fact that in high performance vehicles the wheels on which tyre 1 is mounted can have such a camber angle that the footprint area S acts much more on the inner side of the tyre itself.

Formed in the inner intermediate circumferential portion 14 is a plurality of intermediate blocks 24 of a substantially parallelogram-shaped conformation, preferably offset in a circumferential direction relative to the centre blocks 20. Each intermediate block 24 is delimited relative to the circumferentially adjacent intermediate block 24, by an intermediate transverse groove 25 of a depth included just as an indication, between about 2 mm and about 8 mm, equal to about 6 mm for example, and opening into the circumferential centre groove 10 and the inner-shoulder circumferential groove 11, on respectively opposite sides.

Each intermediate transverse groove 25 of a width L6 preferably included between about 4 mm and about 8 mm, preferably equal to about 7 mm, is obliquely oriented at an angle $\alpha 2$ in the range of about 5° to about 20°, preferably of about 10°, relative to a direction perpendicular to the equatorial plane Y. More particularly, the intermediate transverse grooves 25 are preferably oriented substantially in parallel to the transverse centre cuts 21.

The inner-shoulder circumferential portion 16, of a width W3 included just as indication between about 16% and about 22% of the overall width W of the tread band 7, must ensure an excellent grip on the ground during the acceleration and braking steps, particularly on a straight stretch, above all if tyre 1 is mounted with an important camber angle. The inner-shoulder circumferential portion 16 could further efficiently counteract the slip thrusts, i.e. those directed parallel to the axis of tyre 1, generated when bends at high speed are negotiated.

To this aim, formed in the inner-shoulder circumferential portion 16 is a plurality of first inner-shoulder cuts 26, of a depth P5 included just as an indication, between about 2 mm and about 8 mm, equal to about 6 mm for example, and extending from the axially internal side edge 18 of the tread band 7 to the inner-shoulder circumferential groove 11, according to a pitch corresponding to the distribution pitch of the centre 20 and intermediate 24 blocks.

Each first inner-shoulder cut 26, of a width L7 preferably included between about 5 mm and about 10 mm, and preferably of about 8 mm, is obliquely oriented at an angle $\alpha 3$ included between about 5° and about 20°, preferably of about 10°, relative to a direction perpendicular to the equatorial plane Y, in a crossed orientation relative to the circumferential centre grooves 9, 10 and intermediate grooves.

Also circumferentially alternated in sequence between the first inner-shoulder cuts 26, are second inner-shoulder cuts 27 axially offset relative to said first inner-shoulder cuts 26. The second inner-shoulder cuts 27, obliquely oriented at an angle $\alpha 4$ included between about 5° and about 20° relative to a direction perpendicular to the equatorial plane Y, preferably parallelly with respect to the first inner-shoulder cuts 26, have a width L8 included just as an indication, between about 5 mm and about 10 mm, preferably of about 8 mm, and can have a depth P6 in the range of about 2 mm to about 8 mm.

Auxiliary inner-shoulder cuts 28 extend from the inner-shoulder circumferential groove 11 according to a length smaller than that of the first inner-shoulder cuts 26 and preferably corresponding to about half said length, and terminate with respective ends 28a circumferentially in alignment with the ends 26a of the first inner-shoulder cuts 26.

The first inner-shoulder cuts 26 are further circumferentially alternated with the second inner-shoulder cuts 27, each extending from the axially internal side edge 18 of the tread band 7, in parallel to the first inner-shoulder cuts 26 themselves, each preferably in longitudinal alignment with respect to one of the auxiliary inner-shoulder cuts 28. The auxiliary inner-shoulder cuts 28 have a depth P7 included just as an indication between about 2 mm and about 8 mm, equal to 2.5 mm for example, and a width L9 preferably included between about 5 mm and about 10 mm, preferably equal to about 8 mm. The length X3 of the auxiliary inner-shoulder cuts 28 measured perpendicularly to the equatorial plane Y, is preferably smaller than the length X1 of the first inner-shoulder cuts 26 and corresponds to about half the latter, for example. The sum of the lengths X2, X3 of one of the second inner-shoulder cuts 27 and one of said auxiliary inner-shoulder cuts 28 is substantially the same as the length X1 of each first inner-shoulder cut 26.

As shown in the drawings, the first inner-shoulder cuts 26 and second inner-shoulder cuts 27 can extend beyond the axially internal side edge 18 of the tread band 7 delimited by the footprint area S.

Advantageously, the first 26 and second 27 inner-shoulder cuts are mutually alternated in such a manner that they delimit at least one continuous inner-shoulder rest surface 29 extending in an undulated course along the extension of the inner-shoulder circumferential portion 16 (shown in chain line in FIG. 2), so as to ensure constant resting of the tyre on the ground and satisfactory resistance to slip stresses.

Preferably, the first and second inner-shoulder cuts, 26, 27, as well as the auxiliary inner-shoulder cuts 28 have respective ends 26a, 27a, 28a with a rounded profile, preferably of semicircular shape, so as to minimise the strain capability of the material at said cuts.

The outer-shoulder circumferential portion 17, of a width W4 included just as an indication between about 15% and about 20% of the overall width W of the tread band 7, is particularly stressed when bends at high speed are to be covered, and also under these circumstances it must ensure an excellent grip on the ground on acceleration and braking, and offer excellent response features to handling also on bends when the grip limits are reached.

To this aim, the outer-shoulder circumferential portion 17 has first outer-shoulder cuts 30, of a depth P8 included just as an indication between about 2 mm and about 8 mm, and equal to 6 mm for example, which extends from the axially external side edge 19 of the tread band 7 to the outer-shoulder circumferential groove 12, according to a pitch corresponding to the distribution pitch of the centre 20 and intermediate 24 blocks.

Each first outer-shoulder cut 30, of a width L10 preferably included between about 2 mm and about 8 mm, preferably corresponding to about 6.5 mm, is obliquely oriented at an angle $\alpha 5$ in the range of about 5° to about 20°, preferably of about 10°, relative to a direction perpendicular to the equatorial plane Y, in a crossed orientation with respect to the transverse centre 23 and intermediate 25 grooves and preferably substantially parallel to the first inner-shoulder cuts 26.

Circumferentially distributed in alternated sequence between the first outer-shoulder cuts 30 are second outer-shoulder cuts 31, axially offset relative the said first outer-shoulder cuts 30. The second outer-shoulder cuts 31 are obliquely oriented at an angle $\alpha 6$ included between about 5° and about 20° relative to a direction perpendicular to the equatorial plane Y, substantially parallel to the transverse intermediate grooves 25. Said second outer-shoulder cuts 31 and the first outer-shoulder cuts 30 converge preferably symmetrically relative to a direction perpendicular to the equatorial plane Y, according to a convergence angle $\beta 1$ included just as an indication between about 10° and about 40°, preferably included between about 15° and about 25°, equal to about 20° in the example shown.

The second outer-shoulder cuts 31 extend from the outer-shoulder circumferential groove 12 for a smaller length X5 than the length X4 of the first outer-shoulder cuts 30. The second outer-shoulder cuts 31 have a width L11 included just as an indication between about 2 mm and about 8 mm, preferably equal to about 6.5 mm and can have a depth P9 included between about 5 mm and 8 mm, preferably of 6 mm.

Auxiliary outer-shoulder cuts 32 also extend from the axially external side edge 19 of the tread band 7 and they are circumferentially distributed in an alternated sequence between the first outer-shoulder cuts 30, substantially parallel to said second outer-shoulder cuts 31, in a crossed direction relative to the extension of said first outer-shoulder cuts 30. The auxiliary outer-shoulder cuts 32 have a depth P10 included just as an indication between about 2 mm and about 8 mm, and equal to 6 mm for example, and a width L12 preferably in the range of about 2 mm to about 8 mm, preferably of about 6.5 mm. The sum of the lengths X5, X6 of one of the second outer-shoulder cuts 31 and one of said auxiliary outer-shoulder cuts 32 is preferably smaller than the length X4 of each first outer-shoulder cut 30.

The first outer-shoulder cuts 30 and auxiliary outer-shoulder cuts 32 can extend beyond the axially external side edge 19 of the tread band 7 delimited by the footprint area S.

Advantageously, the first and second outer-shoulder cuts 30, 31 mutually alternate in such a manner that they confine at least one continuous outer-shoulder rest surface 33 extending in an undulated course (highlighted in chain line in FIG. 2) along the circumferential extension of the outer-shoulder circumferential portion 17, so as to ensure constant resting of the tyre on the ground and satisfactory resistance to slip stresses on running.

Preferably, the first and second outer-shoulder cuts 30, 31, as well as the auxiliary outer-shoulder cuts 32, have respective ends 30a, 31a and 32a with a preferably semicircular rounded profile, so as to minimise the strain capability of the material at said cuts and reduce localised heating of the material when tyre 1 is running under hard conditions.

The outer intermediate circonferential portion 15 too, of a width W5 included just as an indication between about 15% and about 20% of the overall width W of the tread band 7 is particularly stressed when bends at high speed are covered, and it must ensure a good behaviour during acceleration and braking, and also offer excellent response features to handling.

To this aim, the outer intermediate circumferential portion 15 has first intermediate cuts 34 of a depth P11 included just as an indication between about 2 mm and about 8 mm, and equal to 6 mm for example, which are circumferentially distributed according to a pitch corresponding to the distribution pitch of the centre 20 and intermediate 24 blocks and each symmetrically disposed between the outer-shoulder 12 circumferential groove and the adjacent circumferential centre groove 9.

Each first intermediate cut 34, of a width L13 preferably included between about 2 mm and about 8 mm, preferably equal to about 6.5 mm, is obliquely oriented at an angle $\alpha 7$ in the range of about 5° to about 20°, preferably equal to about 10°, relative to a direction perpendicular to the equatorial plane Y, in an orientation substantially parallel to the first inner-shoulder cuts 26 and the first outer-shoulder cuts 30, each of them being preferably in alignment with one of the latter.

Circumferentially distributed in an alternated sequence between the first intermediate cuts 34 are second intermediate cuts 35 axially offset relative to said first intermediate cuts 34. The second intermediate cuts 35 are obliquely oriented at an angle $\alpha 8$ in the range of about 5° to about 20° relative to a direction perpendicular to the first intermediate cuts 34, preferably symmetrically with respect to a direction perpendicular to the equatorial plane Y, according to a convergence angle $\beta 2$ included just as an indication between about 10° and about 40°, preferably in the range of about 15° to about 25°, being equal to about 20° in the example shown.

The second intermediate cuts 35 extend from the outer-shoulder circumferential groove 12 for a length X8 smaller than the length X7 of the first intermediate cuts 34, each being preferably in alignment with, and more specifically in the continuation of one of the second outer-shoulder cuts 31, in an orientation substantially parallel to the transverse intermediate grooves 25. The sum of the lengths X8, X5 of the second intermediate cuts 35 and the second outer-shoulder cuts 31 is substantially the same as the length X7 of the first intermediate cuts 34.

The second intermediate cuts 35 have a width L14 included just as an indication between about 2 mm and about 8 mm, preferably equal to about 6.5 mm and can have a depth P12 included between about 5 mm and 8 mm, preferably equal to 6 mm.

Advantageously, the first 34 and second 35 intermediate cuts mutually alternate in such a manner as to delimit at least one continuous intermediate rest surface 36, extending in an undulated course (highlighted in chain line in FIG. 2) along the circumferential extension of the outer intermediate circumferential portion 15, so as to ensure constant resting of the tyre on the ground and satisfactory resistance to slip stresses.

Preferably, the first 34 and second 35 intermediate cuts have at least one end 34a, 35a with a preferably semicircular rounded profile, so as to minimise the strain capability of the material.

The first outer-shoulder cuts 30 may be each advantageously provided to terminate with one of their ends 30a close to the outer-shoulder circumferential groove 12, to a distance therefrom included just as an indication between about 2.5 mm and about 10 mm.

In another embodiment, each of the first intermediate cuts 34 may be advantageously provided to terminate with one of its ends 34a close to the outer-shoulder circumferential groove 12, to a distance therefrom included just as an indication between about 4 mm and about 10 mm. In this way, the first outer-shoulder cuts 30 and/or the first intermediate cuts 34 may be caused to converge into the outer-shoulder circumferential groove 12, following enlargement of the latter by means of suitable cutting tools when, due for example to a sports race on a wet roadway surface, water draining by tyre 1 is wished to be made more marked.

As previously said, the function of draining water from the footprint area S during running on a wet roadway surface is particularly concentrated in the regions closest to the equatorial plane Y, while the regions close to the side edges of the tread band 7 are mainly dedicated to ensure a good traction power and good behaviour on braking, and to efficiently counteract the slip thrusts during direction changes of the vehicle and running on a bend. For these reasons, the central circumferential portion 13 and inner intermediate circumferential portion 14 have a solid/hollow ratio that is basically greater than that found in other circumferential portions 15, 16, 17 of the tread band 7.

More particularly, the central circumferential portion 13 preferably has a solid/hollow ratio included between about 0.22 and about 0.36. The inner intermediate circumferential portion 14 can have a solid/hollow ratio included between about 0.27 and about 0.370, greater than the solid/hollow ratio in the central circumferential portion 13 above all when tyre 1 is intended for use with important camber angles.

The inner-shoulder circumferential portion 16 preferably has a solid/hollow ratio in the range of about 0.20 to about 0.26.

In the outer-shoulder circumferential portion 17, the solid/hollow ratio is preferably included between about 0.12 and about 0.24. The outer intermediate circumferential portion 15 in turn can have a solid/hollow ratio included between about 0.16 and about 0.32.

By "solid/hollow" ratio it is intended the value of the ratio detectable in the footprint area S between the tread band 7 portions taken up by cuts and/or grooves (hollows) and therefore having no physical contact with the ground, and the extension of the footprint area S itself.

It will be recognised that, for determining the solid/hollow ratio, the circumferential portions 13, 14, 15, 16, 17 of the tread band 7 are conventionally considered as delimited along the middle axes of the respective circumferential grooves 9, 10, 11, 12, in contrast to what happens for determining the width of each circumferential portion, that is measured at the side edges of the grooves and/or the tread band 7.

The invention claimed is:
1. A tyre for vehicles comprising a tread band comprising:
a central circumferential portion disposed close to an equatorial plane of the tyre and axially confined between two circumferential centre grooves;
an inner intermediate circumferential portion axially confined between an inner-shoulder circumferential groove and a circumferential centre groove axially close to said inner-shoulder circumferential groove;

an inner-shoulder circumferential portion axially confined between said inner-shoulder circumferential groove and an axially internal side edge of the tread band;

an outer intermediate circumferential portion axially confined between an outer-shoulder circumferential groove and the circumferential centre groove axially close to said outer-shoulder groove; and an outer-shoulder circumferential portion axially confined between said outer-shoulder circumferential groove and an axially external side edge of the tread band, wherein:

said central circumferential portion is subdivided into centre blocks circumferentially confined between transverse centre cuts opening into the circumferential centre grooves;

said inner intermediate circumferential portion is subdivided into intermediate blocks circumferentially confined between intermediate transverse grooves, each opening into a respective circumferential centre groove and said inner-shoulder circumferential groove;

said inner-shoulder circumferential portion has first and second inner-shoulder cuts axially offset from each other and circumferentially distributed in an alternated sequence to delimit at least one continuous inner-shoulder rest surface extending in an undulated course along a circumferential extension of the inner-shoulder circumferential portion;

said outer intermediate circumferential portion has first and second intermediate cuts extending in mutually converging directions at an angle of about 10° to about 40°, axially offset from each other and circumferentially distributed in an alternated sequence, to delimit at least one continuous intermediate rest surface extending in an undulated course along a circumferential extension of the outer intermediate circumferential portion; and said outer-shoulder circumferential portion has first and second outer-shoulder cuts extending in mutually converging directions at an angle of about 10° to about 40°, axially offset from each other and circumferentially distributed in an alternated sequence, to define at least one continuous outer-shoulder rest surface extending in an undulated course along a circumferential extension of the outer-shoulder circumferential portion.

2. The tyre as claimed in claim 1, wherein said first and second outer-shoulder cuts extend in mutually converging directions at an angle of about 15° to about 25°.

3. The tyre as claimed in claim 1, wherein said first and second intermediate cuts extend in mutually converging directions at an angle of about 15° to about 25°.

4. The tyre as claimed in claim 1, wherein said outer-shoulder circumferential portion has a width of about 15% to about 20% of an overall width of the tread band.

5. The tyre as claimed in claim 1, wherein said outer intermediate circumferential portion has a width of about 15% to about 20% of an overall width of the tread band.

6. The tyre as claimed in claim 1, wherein said central circumferential portion has a width of about 14% to about 19% of an overall width of the tread band.

7. The tyre as claimed in claim 1, wherein said inner intermediate circumferential portion has a width of about 12% to about 18% of an overall width of the tread band.

8. The tyre as claimed in claim 1, wherein said inner-shoulder circumferential portion has a width of about 16% to about 22% of an overall width of the tread band.

9. The tyre as claimed in claim 1, wherein said outer-shoulder circumferential portion has a solid/hollow ratio of about 0.12 to about 0.24.

10. The tyre as claimed in claim 1, wherein said outer intermediate circumferential portion has a solid/hollow ratio of about 0.16 to about 0.32.

11. The tyre as claimed in claim 1, wherein said central circumferential portion has a solid/hollow ratio of about 0.22 to about 0.36.

12. The tyre as claimed in claim 1, wherein said inner intermediate circumferential portion has a solid/hollow ratio of about 0.27 to about 0.37.

13. The tyre as claimed in claim 1, wherein said inner-shoulder circumferential portion has a solid/hollow ratio of about 0.20 to about 0.26.

14. The tyre as claimed in claim 1, wherein said first and second intermediate cuts extend in symmetrically mutually converging directions relative to a direction perpendicular to the equatorial plane.

15. The tyre as claimed in claim 1, wherein said first and second outer-shoulder cuts extend in symmetrically mutually converging directions relative to a direction perpendicular to the equatorial plane.

16. The tyre as claimed in claim 1, wherein said first intermediate cuts each extend in a direction parallel to one of said first outer-shoulder cuts.

17. The tyre as claimed in claim 1, wherein each of said second intermediate cuts extends in alignment with one of said second outer-shoulder cuts.

18. The tyre as claimed in claim 1, wherein each of said second intermediate cuts extends in a continuation of one of said second outer-shoulder cuts, through said outer-shoulder circumferential groove.

19. The tyre as claimed in claim 1, wherein said first intermediate cuts and first outer-shoulder cuts are oriented substantially parallel to the first inner-shoulder cuts.

20. The tyre as claimed in claim 1, wherein said second intermediate cuts and second outer-shoulder cuts are oriented substantially parallel to said intermediate transverse grooves.

21. The tyre as claimed in claim 1, further comprising auxiliary outer-shoulder cuts extending from an axially external side edge of the tread band, substantially parallel to said second outer-shoulder cuts in a converging direction relative to the extension of the first outer-shoulder cuts.

22. The tyre as claimed in claim 1, wherein said first intermediate cuts have a length substantially corresponding to a sum of lengths of the second intermediate cuts and the second outer-shoulder cuts.

23. The tyre as claimed in claim 1, wherein said first outer-shoulder cuts have a greater length than a length of the second outer-shoulder cuts.

24. The tyre as claimed in claim 21, wherein a length of each first outer-shoulder cut is greater than a sum of the lengths of one of the second outer-shoulder cuts and one of said auxiliary outer-shoulder cuts.

25. The tyre as claimed in claim 1, wherein said first and second outer-shoulder cuts have at least one end with a rounded profile.

26. The tyre as claimed in claim 1, wherein said first and second intermediate cuts have at least one end with a rounded profile.

27. The tyre as claimed in claim 1, wherein the inner-shoulder circumferential groove and outer-shoulder circumferential groove are symmetrically disposed relative to said equatorial plane.

28. The tyre as claimed in claim , wherein said first and second inner- shoulder cuts respectively extend from an axially internal side edge of the tread band to said inner-shoulder circumferential groove.

29. The tyre as claimed in claim 1, wherein said first inner-shoulder cuts are obliquely oriented at an angle about 5° to about 20° relative to a direction perpendicular to the equatorial plane.

30. The tyre as claimed in claim 1, wherein said second inner-shoulder cuts are obliquely oriented at an angle of about 5° to about 20° relative to a direction perpendicular to the equatorial plane.

31. The tyre as claimed in claim 1, wherein said first inner-shoulder cuts are oriented parallel to the second inner-shoulder cuts.

32. The tyre as claimed in claim 1, wherein said first inner-shoulder cuts have a greater length than the length of the second inner-shoulder cuts.

33. The tyre as claimed in claim 1, further comprising auxiliary inner-shoulder cuts each extending from said inner-shoulder circumferential groove in alignment with one of said second inner-shoulder cuts.

34. The tyre as claimed in claim 33, wherein a length of each first inner-shoulder cut substantially corresponds to a sum of the lengths of one of the second inner-shoulder cuts and one of said auxiliary inner-shoulder cuts.

35. The tyre as claimed in claim 1, wherein said first inner-shoulder cuts and auxiliary inner-shoulder cuts have respective ends in circumferential alignment with each other.

36. The tyre as claimed in claim 1, wherein said first and second inner-shoulder cuts have respective ends with a rounded profile.

37. The tyre as claimed in claim 1, wherein said circumferential centre grooves are symmetrically disposed relative to said equatorial plane.

38. The tyre as claimed in claim 1, wherein said transverse centre cuts, converging into one and the other respectively of said circumferential centre grooves are mutually connected to form transverse centre grooves, each opening into both of the circumferential centre grooves.

39. The tyre as claimed in claim 1, wherein said intermediate blocks are circumferentially offset relative to the centre blocks.

40. The tyre as claimed in claim 1, wherein the centre blocks and intermediate blocks have a substantially parallelogram-shaped conformation.

41. The tyre as claimed in claim 1, wherein the transverse centre cuts are obliquely oriented at an angle of about 5° to about 20° relative to a direction perpendicular to the equatorial plane.

42. The tyre as claimed in claim 1, wherein the intermediate transverse grooves are obliquely oriented at an angle of about 5° to about 20° relative to a direction perpendicular to the equatorial plane.

43. The tyre as claimed in claim 1, wherein the intermediate transverse grooves are oriented parallel to the transverse centre cuts.

44. The tyre as claimed in claim 1, wherein each of said circumferential centre grooves has a width of about 5 mm to about 15 mm.

45. The tyre as claimed in claim 1, wherein said circumferential centre grooves have a same width with respect to each other.

46. The tyre as claimed in claim 1, wherein the inner-shoulder circumferential groove has a smaller width than a width of the circumferential centre grooves.

47. The tyre as claimed in claim 1, wherein the inner-shoulder circumferential groove has a width of about 5 mm to about 12 mm.

48. The tyre as claimed in claim 1, wherein the outer-shoulder circumferential groove has a smaller width than that of the circumferential centre grooves.

49. The tyre as claimed in claim 1, wherein the outer-shoulder circumferential groove has a smaller width than a width of the inner-shoulder circumferential groove.

50. The tyre as claimed in claim 1, wherein the outer-shoulder circumferential groove has a width of about 1 mm to about 8 mm.

51. The tyre as claimed in claim 1, wherein at least the first outer-shoulder cuts have ends spaced apart from the outer-shoulder circumferential groove by a distance of about 2.5 mm to about 10 mm.

52. The tyre as claimed in claim 1, wherein at least said first intermediate cuts have ends spaced apart from the outer-shoulder circumferential groove by a distance of about 4 mm to about 10 mm.

* * * * *